May 15, 1945.  D. H. MITCHELL  2,375,863
CONVEYER SYSTEM
Filed May 5, 1942    2 Sheets-Sheet 1
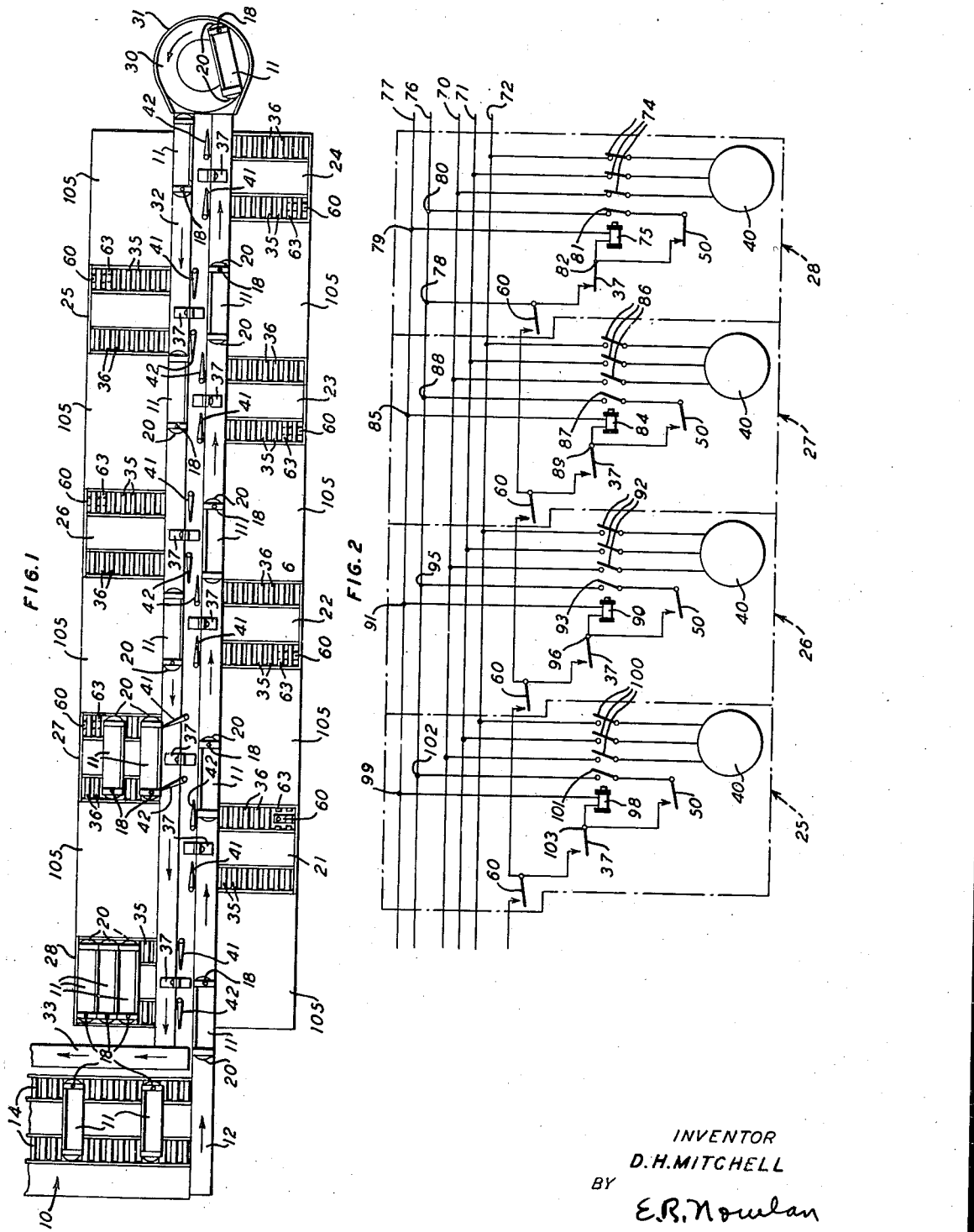
INVENTOR
D. H. MITCHELL
BY
E. R. Nowlan
ATTORNEY May 15, 1945.  D. H. MITCHELL  2,375,863
CONVEYER SYSTEM
Filed May 5, 1942  2 Sheets-Sheet 2
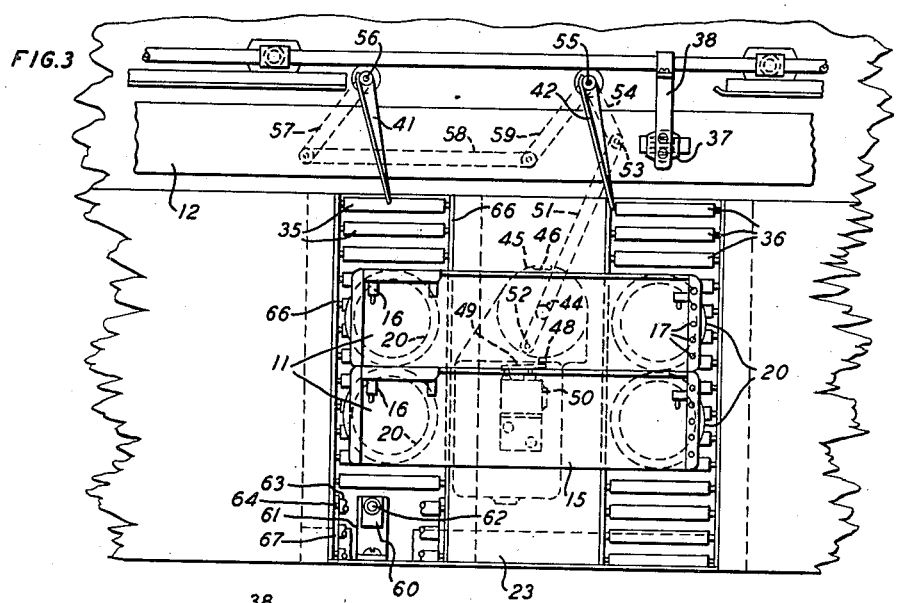
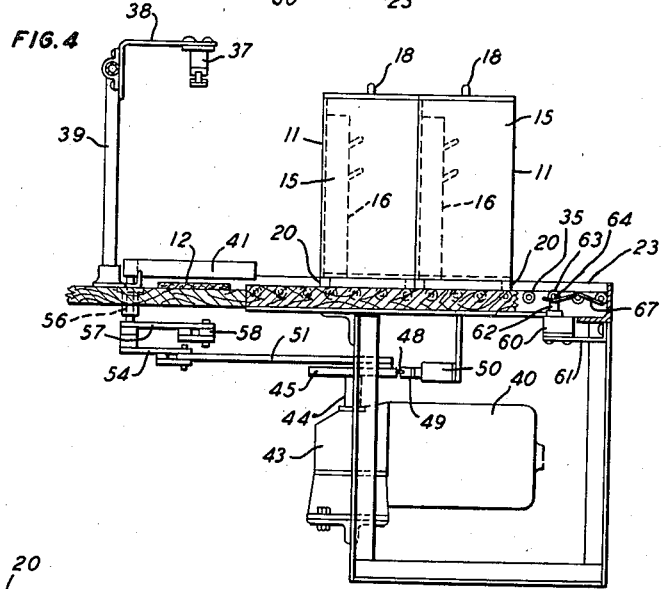
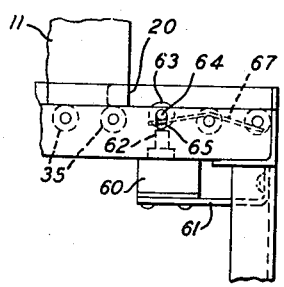
INVENTOR
D. H. MITCHELL
BY
E. R. Nowlan
ATTORNEY Patented May 15, 1945

2,375,863

UNITED STATES PATENT OFFICE 2,375,863

CONVEYER SYSTEM

Donald H. Mitchell, Cranford, N. J., assignor to Western Electric Company, Incorporated, New York, N. Y., a corporation of New York Application May 5, 1942, Serial No. 441,799

3 Claims. (Cl. 198—24)

This invention relates to conveyer systems, and more particularly to conveyer systems for serving a plurality of work receiving stations.

In providing a conveyer system which will supply articles or carriers of articles to a plurality of stations where work is to be performed on the articles, numerous problems arise, the solutions of which are essential to maintain the work stations suitably supplied with the articles. Certain of these problems are to control the deflectors at different stations so that when one station is filled with carriers subsequent carriers will not be directed to that station but to other designated stations and the carriers will not be directed to the filled station until a certain number of the carriers has been removed therefrom. These and other problems must be solved to properly supply the stations with articles and to eliminate the necessity of workers at any of the stations from removing carriers from the conveyer, which acts may cause injury to both the carriers, the articles therein and the worker.

An object of the invention is to provide a carrier system which is simple in structure, highly efficient and completely automatic in operation to convey articles selectively to a plurality of stations.

With this and other objects in view, the invention comprises a conveyer system having a main conveyer, movable continuously relative to a plurality of spaced work stations, with deflectors disposed adjacent the stations controlled by means dependent upon the supply of articles at certain of the stations for the rendering of the deflectors at other stations effective for actuation.

Other objects and advantages will be apparent from the following detailed description when considered in conjunction with the accompanying drawings, wherein Fig. 1 is a schematic top plan view of the conveyer system;

Fig. 2 is a wiring diagram illustrating certain of the electrical circuits for the automatic control of the conveyer system;

Fig. 3 is an enlarged fragmentary top plan view of the conveyer system at one of the work stations;

Fig. 4 is a vertical sectional view of the structure shown in Fig. 3, and

Fig. 5 is a fragmentary detailed view of a roller switch structure at one of the work stations.

Referring now to the drawings, attention is first directed to Fig. 1, where, at the extreme left, a gravity feeding structure, indicated generally at 10, is provided to supply carriers 11 to a main conveyer 12. The structure 10 is composed of spaced series of rollers 14, to support the ends of the carriers 11, these series of rollers being disposed at like inclined angles to feed the carriers by gravity onto the main conveyer 12. The illustration in Fig. 1 is but schematic, it being understood that suitable means, such as guide rails, may be provided for the conveyer 12 to maintain the carrier in place thereon.

In the present embodiment the carriers are formed of a frame 15 (Figs. 3 and 4) of a contour adapted to support an article 16 in a vertical position. One end of the frame is provided with a plurality of pin receiving apertures 17, the pins being shown in Fig. 4 and identified by reference numeral 18, the purpose of these pins being hereinafter described. The frame 15 of each carrier is rigidly mounted upon annular supports 20 to adapt the carriers for movement sideways down the feeding means 10 or longitudinally on the conveyer 12, they also being adapted for movement sideways at the work stations as will hereinafter be described.

As shown in Fig. 1, the conveyer 12 travels by a plurality of laterally positioned work stations 21, 22, 23 and 24, other work stations being identified by reference numerals 25, 26, 27 and 28. The conveyer 12 may be of the endless belt type, continuously driven by suitable means (not shown) to convey the carriers at the extreme end thereof if the carriers are not previously deflected to any of the work stations 21 to 24 inclusive. At the exit end of the conveyer 12, a turntable 30 is disposed, rotating continuously in the direction of the arrow and provided with a suitable guide rail 31. The turntable 30 is adapted to receive the carriers from the conveyer 12 and transfer them to a conveyer 32. The conveyer 32 is similar to the conveyer 12 and travels from the turntable 30 to its exit end, where, if desired, the carriers 11 may be transferred to another conveyer 33 adapted to convey the carriers to another arrangement of work stations if it is desired that this conveyer system feed carriers to a greater number of work stations than those shown.

Attention is now directed to the detailed structure of each work station. The work stations are identical in structure, provided with the same control means and deflectors so that a description of one will apply equally well to them all. The work station shown in Figs. 3 and 4 includes spaced sets of rollers 35 and 36, similar in structure to the sets of rollers of the gravity feeding means 10, to receive the annular supports 20 of the carriers 11 when moved in a right angle direction from their associated conveyer. For the purpose of illustration, let it be assumed that the work station shown in Figs. 3 and 4 is the work station 23 and that the conveyer associated therewith is conveyer 12. At a selected position adjacent the sets of rollers 35 and 36 above the conveyer 12, a trigger switch 37 is supported by a bracket 38 and an upright 39, so as to be located at a definite position over the conveyer to be actuated by a pin 18 disposed in a definite aperture 17 of the carrier. If the control means of the conveyer system is such that carriers approaching the work station 23 are to be deflected onto this station, the trigger switch 37 will be rendered effective through means hereinafter described, to cause energization of a motor 40 to actuate a deflector or deflector unit including a pair of deflector elements 41 and 42 which, when actuated, will engage the adjacent carrier near the ends thereof and move the carrier at right angles from the conveyer 12 and onto the rollers 35 and 36 at the station 23.

Referring now to the specific structure of the actuating means linking the motor 40 with the deflector elements 41 and 42, attention is first directed to Fig. 4, which shows a speed reducing unit 43 of a suitable conventional type having an output shaft 44 supporting an element 45. The element 45 serves two purposes, one as a cam and the other as a crank. The outer periphery of the element 45 acts as a cam, it being concentric with the shaft 44 except at a low or recessed portion 46 of the contour shown in Fig. 3. A roller 48 of a switch lever 49 is positioned to ride upon the periphery of the element 45 and be received in the recess 46. During the normal position of the deflector, that is when the deflector elements 41 and 42 are in their idle or normal positions, the recess 46 of the element is positioned to receive the roller 48 to maintain a switch 50, associated therewith, in open position. The moment the motor 40 is energized, causing rotation of the element 45 through the unit 43, the roller 48 will be caused to ride upon the periphery of the element, that is the high cam portion thereof, immediately effecting closure of the switch and maintaining this condition for substantially the full cycle of rotation of the element, until the recess 46 is again presented to the roller. During this cycle of rotation of the element 45 a mechanism linking the element 45 with the deflectors causes movement of the deflectors from their normal aligned positions parallel with the conveyer 12 to the position shown in Fig. 3 and back into their normal position. This mechanism includes a link 51 pivotally connected, at one end of the element 45, at 52, adjacent the periphery of the element, the other end of the link being pivotally connected, at 53, to a lever 54. The lever 54 is mounted upon the lower end of a shaft 55, the upper end of which fixedly supports deflector element 42. A similar shaft 56 has the deflector element 41 rigidly mounted upon the upper end thereof, the lower end of this shaft rigidly supporting a lever 57, which is connected through a link 58 to a lever 59, the latter being mounted upon the shaft 55. This completes the mechanism for causing actuation of the deflectors 41 and 42 during each cycle of rotation of the element 45.

There is another switch provided for each work station which serves an important function in the controlling means of the conveyer system. This switch is indicated at 60 and is supported by a suitable bracket 61 so that a plunger 62 of the switch will be positioned adjacent or directly beneath a roller 63 of the set of rollers 35. The roller 63 instead of being mounted just for rotation is mounted also for vertical movement, a shaft 64 thereof having one or both ends disposed in elongate apertures 65 of supporting frames 66 at the sides of the rollers. Suitable springs 67, mounted in the manner shown in Fig. 5, are adapted to normally urge the roller 63 at one or both ends thereof upwardly out of general alignment with the other rollers, so that a carrier 11, when moved into the last position of the station 23, will move the roller downwardly to cause actuation of the plunger 62 and close the switch 60. Such a structure is provided at each station.

It should be understood that the series of rollers 35 and 36 at each work station are disposed in a truly horizontal plane so that the carriers will not move by gravity from the entrance ends of the work stations, it being necessary that the station be filled with carriers before the switch 60 will be actuated.

Attention is now directed to the wiring diagram in Fig. 2. A complete wiring diagram for the entire control system has not been shown due to the fact that the groups of electrical circuits therein are identical with the exception of the last group, and for this reason it was thought that the illustration of the groups of circuits for the work stations 25 to 28 inclusive would be sufficient for a clear understanding of the invention. Considering first the group of circuits at the extreme right in Fig. 2, the motor 40 shown therein represents the motor for the station 28 and the switches 37, 50 and 60 serve to control the motor for this station. Electrical supply lines 70, 71 and 72 provide electrical energy for the motors 40 when the relay contacts controlling the respective circuits to the motors are closed. In the group of circuits under consideration, a plurality of contacts 74 is diposed in conductors connecting the motor 40 to the supply lines 70, 71 and 72. The contacts 74 are under the control of a relay 75 which receives its electrical energy from other supply lines 76 and 77. For example, when the trigger switch 37 adjacent the work station 28 is closed by a pin 18 of a carrier, a circuit is completed from line 76 at connection 78 through switch 37, relay 75, to line 77 at connection 79. Thus, upon actuation of the switch 37 at the station 28, the relay 75 will be energized to close the contacts 74, completing the circuits through the motor 40 for this station, effecting actuation of the element 45 (Fig. 4) and the immediate closing of the switch 50 associated therewith. The closure of the switch 50 will complete a locking circuit from line 76 at connection 80, through contact 81, under the control of the relay 75, switch 50, connection 82, relay 75, to line 77 at connection 79. The closure of the switch 37 at the station 28 may be momentary, the relay 75 being locked in, however, and placed under the control of the element 45 so that the motor 40 associated therewith will be caused to remain energized through a complete cycle of the element and thus through a complete cycle of movement of the deflectors 41 and 42. With this arrangement the electrical circuits just described, associated with the station 28, will remain effective to cause repeated deflection of carriers from the conveyor 32 onto the work station 28 until this station has been filled, at which time the switch 60 will have been closed through the movement of a carrier into the last section of this station. When this occurs the closure of the switch 60 at the station 28 will condition another series of circuits associated with the station 27, so as to cause operation of the deflectors at this station to deflect the oncoming carriers.

The circuits for the station 27 are identical with the circuits associated with the station 28, the one exception being, however, that the circuits for the station 28 are not under the control of a switch 60 of a previous station. The closure of the switch 60 at the station 28 will render the switch 37 at the station 27 effective upon actuation of a pin 18 of an oncoming carrier, so that a circuit may be traced from line 76 at connection 78, through switch 60 (of station 28), switch 37 (of station 27), relay 84, to line 77 at connection 85. Upon energization of the relay 84, its associated contacts 86 will be closed to complete a circuit from the supply lines 70, 71 and 72 to the motor 40 of the station 27. The relay 84 will also close a contact 87 of a locking circuit which has been completed by the closure of the associated switch 50, upon the energization of its motor 40, this circuit being traced from line 76 at connection 88 through contact 87, switch 50, connection 89, relay 84, to line 77 at connection 85. Through this arrangement, as long as the switch 60 of station 28 remains closed the series of circuits associated with the station 27 will be rendered effective to deflect carriers onto station 27 until this station becomes filled with carriers, at which time its switch 60 will be closed by the carrier entering the last position, thus conditioning the series of circuits for the station 26 for the ejection of carriers thereon.

At station 26 a relay 90 is energized in a circuit which may be traced from line 76 at connection 78 through the switch 60 for station 28, the switch 60 for station 27, through the switch 37 for station 26, the relay 90, to line 77 at connection 91. In a similar manner contacts 92 under the control of the relay 90 are closed electrically, connecting the motor 40 of the station 26 with the supply lines 70, 71 and 72 and closing a contact 93 to complete a locking circuit for the relay 90. The locking circuit may be traced from line 76 at connection 95 through contact 93, switch 50, when closed by its associated element 45 upon energization of the motor 40 of station 26, through a connection 96, relay 90, to line 77 at connection 91. Thus the control system for the station 26 will be rendered effective to deflect the carriers at this station as long as the stations 27 and 28 remain filled or until either one of these stations has been relieved of the carrier holding the switch 60 thereof closed.

The series of circuits for the station 25 are under the control of a relay 98 and the switches 37 and 50 of this station as well as the switches 60 of the stations 26, 27 and 28. Thus, upon filling the subsequent stations with carriers to cause closure of their switches 60, the circuit for the relay 98 will be completed from line 76 at connection 78 through the switches 60 of stations 28, 27 and 26, through switch 37 of station 25, when closed, relay 98, to line 77 at connection 99. The energization of the relay 98 closes contacts 100 to complete the circuits for the motor 40 of station 25 with the supply lines 70, 71 and 72, closing also a contact 101 of a locking circuit for the relay. This locking circuit may be traced from line 76 at connection 102 through contact 101, switch 50 when closed, connection 103, relay 98, to line 77 at connection 99.

This same series of circuits may be continued for the stations 24, 23, 22 and 21, they being controlled in that order so that the mechanism at each station is under the control of any one of the subsequent stations. At one side of each of the work stations 21 to 28 inclusive is a work table 105, where an operator will be seated to perform the necessary work on the articles delivered by the carriers at the various stations.

Upon considering the operation of the apparatus, attention is first directed to Figs. 3, 4 and 5. A carrier moving longitudinally on the conveyer 12 destined for the station 23 due to the presumed fact that the roller operated switches 60 at stations 24, 25, 26, 27 and 28 are closed, will, through its pin 18, actuate the switch 37 at station 23, causing energization of its relay to close the contacts in the motor circuit and cause energization of the motor. As soon as the motor starts running the element 45 will be rotated to operate the switch 50 through the roller 48 and the lever 49, holding the switch in closed position to complete and maintain the locking circuit for the relay during one complete cycle of rotation of the element. During this cycle of rotation of the element which begins at a time when the carrier is adjacent the station 23, the deflector elements 41 and 42 will be moved from their aligned positions, at one side of, and substantially parallel with the conveyer 12, to the positions shown in Fig. 3 and back into their normal aligned positions. During the first half of the movement of the deflectors they will engage the carrier disposed thereadjacent, their engagement being with the side of the carrier adjacent the ends thereof to move the carrier laterally at right angles to the conveyer 12 onto the rollers 35 and 36. The formation of the supports 20 make it possible for the carrier to be readily moved in any direction.

With this structure and the operation thereof in mind, attention is now directed to Figs. 1 and 2. The carriers 11 may be fed down the gravity feeding means to the conveyer 12 at spaced intervals, so that the carriers will be supplied to the work stations at a sufficient rate to maintain the stations suitably supplied with the carriers. A the beginning, if the stations are all empty it might require a little time to equip the stations with a complete supply of the carriers, but this occasion would not be repeated once the system has been in operation. If such an occasion should arise, however, the operators at various stations may maintain their station ineffective to receive further carriers by moving one carrier over their roller 63 which actuates the switch 60 until the other stations have been provided with carriers. This is one advantage of this type of system. Normally the operator at each station will perform the necessary work on the articles supplied to him by the carriers and when his work is completed on one article he will remove the carrier from the extreme end of his station, that is the carrier resting upon the roller 63 and actuating its control switch 60.

For a further example, following the suggestion shown in Fig. 1, the station 28 is filled with carriers and the station 27 is being supplied with carriers, the deflectors at all other stations being rendered inoperative until the station 27 is supplied with the necessary number of carriers sufficient to cause the first carrier at this station to close the switch 60 thereof. At that time the circuits controlling the deflector for station 26 will be conditioned to deflect the next group of carriers onto this station. This same process will be continued until all the stations are filled, providing none of the carriers from the subsequent stations has been removed from the innermost positions to relieve the rollers 63 thereof which have held their associated switches 60 closed. In other words, the control system gives precedence to the farthest station from the main feed or supply and the moment the carrier controlling the switch 60 thereof has been removed, all other control means for the deflectors of the preceding stations will be rendered ineffective until that station has again been filled. For example, if carriers should be removed from stations 21, 23, 26 and 28 at about the same time, the control system through the circuits, particularly the switches 60 at the various stations, would function to first supply a carrier to the station 28 to maintain this station filled, at which time the control system would function to next supply a carrier to the station 26, after which a carrier would be supplied to station 23 and then a carrier would be supplied to station 21. Furthermore, if the carrier should be advancing toward station 23 and the control system had been conditioned to supply this station with a carrier and a carrier had been removed from the station 25, the control system would immediately be modified to render the deflector mechanism at station 23 ineffective and the control mechanism at station 25 effective until the latter station had been supplied with another carrier to fill that station. Thus through the operation of the conveyer system and under the control of the various switches, carriers which are repeatedly supplied to the conveyer 12 and will travel the full length of this conveyer unless deflected at the stations 21, 22, 23 or 24. If the carriers continue throughout the length of the conveyer 12, they move onto the turntable 30, where they are reversed in their position, travelling around the turntable, and begin their travel on the conveyer 32. Here the carriers continue in their travel until they arrive at one of the stations onto which they are to be deflected, depending upon the condition of the control circuits through the various switches 60. However, at somewhat regular intervals carriers are removed from the different stations as the work on the articles by the operators has been completed, and it is not necessary for any of the operators to assist in the control system as the control system is affected the moment they remove a carrier from their station. Although the operator is not assured that the next carrier travelling along the adjacent carrier will be supplied to his station through the control means, a carrier will be supplied thereto before his station becomes empty, as he has two more carriers at his station, and before the time, necessary for him to complete the work on the articles of these two additional carriers, has elapsed, other carriers will be supplied to his station. It is advantageous, however, that the control system give precedence to the farthest station, as the carriers have farther to travel to arrive at these stations and once they are completely supplied with carriers the stations closer to the supply will be equipped with carriers. The control units of the conveyer system may be defined as a chain of control means or electrical circuits linked together by elements (60, 62 and 63, Fig. 5) or switches under the control of the articles at the stations. The actuation of the deflectors at the various stations depends upon the conditions of the links or switches 60 in the control chain. Any break in the chain will render the entire portion of the chain, forwardly of the break, ineffective and will render the next adjacent portion of the chain operative. Furthermore, if there should be more than one break in the chain, that is, if more than one switch 60 is opened, only the section immediately beyond the farthest break will be operative. There must be a complete formation in the chain, a closure of all switches 60 to any section, excepting the last, 28, for that section to be made operative. Therefore, if all the links or switches 60 are complete or made operative, but if there should be one or more breaks in the chain through the opening of switches 60, only the control unit immediately beyond the farthest break will be operative.

Although specific improvements of the invention have been shown and described it will be understood that they are but illustrative and that various modifications may be made therein without departing from the scope and spirit of this invention as defined by the appended claims.

What is claimed is:

1. In a conveyer system, a station adapted to receive articles, a conveyer adapted to convey the articles relative to the station and disposed at substantially right angles with respect thereto, an article moving arm mounted for movement across the conveyer, power means operable to move the arm across the conveyer to move an article therewith off the conveyer and onto the station, and means disposed adjacent the end of the station farthest from the conveyer and actuable by the first mentioned article to render the power means inoperable when additional articles have been moved onto the station and have moved the first mentioned article to the said farthest end of the station.

2. In a conveyer system, a station adapted to receive articles, a conveyer adapted to convey the articles relative to the station, an article moving arm mounted for movement across the conveyer, an electric motor operatively connected to the arm and adapted to move the arm across the conveyer to move an article therewith off the conveyer and onto the station, an electrical circuit for the motor, an electrical switch actuable by the article when in substantial alignment with the station to cause closing of the motor circuit, and an electric switch disposed at the station to cause opening of the motor circuit when actuated by the first mentioned article when moved adjacent thereto by a given number of additional articles moved onto the station.

3. A conveyer system comprising a station adapted to receive elongate articles, a conveyer adapted to convey the articles longitudinally relative to the station, spaced article moving arms mounted on parallel shafts for movement across the conveyer, means to operatively connect the shafts to cause simultaneous movement of the arms, an electric motor operatively connected to one of the shafts, an electrical circuit for the motor, an electrical switch actuable by the article when they successively reach a position in substantial alignment with the station to cause closing of the motor circuit for energizing the motor and simultaneous rotation of the shafts to move the arms across the conveyer to move the articles singly laterally off the conveyer and onto the station, and an electric switch disposed at the station and adapted to cause opening of the motor circuit when actuated by the first article disposed on the station when moved into engagement therewith by a given number of additional articles moved onto the station.

DONALD H. MITCHELL.